United States Patent
Dombek et al.

(12)

(10) Patent No.: US 6,322,151 B2
(45) Date of Patent: Nov. 27, 2001

(54) POWER BUGGY

(75) Inventors: Gregory S. Dombek, Germantown; Steven E. Jansen, Wild Rose; Alan D. Bengtson, Shorewood; Robert M. Motl, West Bend, all of WI (US)

(73) Assignee: Wacker Corporation, Menomonee Falls, WI (US)

( * ) Notice: Subject to any disclaimer, the term of this patent is extended or adjusted under 35 U.S.C. 154(b) by 0 days.

(21) Appl. No.: 09/730,236

(22) Filed: Dec. 5, 2000

Related U.S. Application Data

(63) Continuation of application No. 09/143,753, filed on Aug. 31, 1998, now Pat. No. 6,155,648.

(51) Int. Cl.$^7$ ........................................................ B60P 1/00
(52) U.S. Cl. ................................................................. 298/1 C
(58) Field of Search ................................. 296/1 H, 1 C, 296/22 R, 17

(56) References Cited

U.S. PATENT DOCUMENTS

| | | | |
|---|---|---|---|
| Re. 33,131 | * | 12/1989 | Morrison . |
| 3,987,294 | * | 10/1976 | Carlson . |
| 4,098,218 | * | 7/1978 | Pichl . |
| 4,207,022 | * | 6/1980 | Castel . |
| 4,995,356 | * | 2/1991 | Kronich . |
| 5,094,315 | * | 3/1992 | Taki et al. . |

OTHER PUBLICATIONS

The Wheel Burro™ from Schroeder Industries, L–2384 Jan. 1997.*
Miller–Scoot–Crete MB11 walk behind power buggy, MB16/21 stand on power buggy and T70 sit–down power buggy, pp. 2–7 (No date).*
Morrison Hydraulic Power Buggies, Morrison Division of Amida Industries, Inc., PUB #372, CG–0197–5M, (No date).*

Whiteman Power Buggies, Amida Industries, Inc. PUB #356–SP–0295–10M.*

* cited by examiner

Primary Examiner—Stephen T. Gordon
Assistant Examiner—Scott Carpenter
(74) Attorney, Agent, or Firm—Boyle Fredrickson Newholm Stein & Gratz S.C.

(57) ABSTRACT

A power buggy is configured to be safe, stable, easy to control, and comfortable. Frequently-used controls such as dump controls, a speed control, and a directional control, are located at or very near handgrips of the operator's handle so as to permit the operator to control the vehicle without releasing either of the handgrips. For instance, speed and direction are both controlled by a bidirectional twist grip forming one of the handgrips. The twist grip must rotate through a neutral position before changing directional control from forward to reverse so that an operator cannot reverse the vehicle's direction of travel without first rather gradually reducing vehicle speed. Operator comfort is also enhanced by a fuel tank that shields the operator from the engine. The fuel tank also has a large capacity while simultaneously functioning as a support for side shrouds of the vehicle. A stowable operator's platform is lockable in both its stowed and operative positions so as to prevent injury to the operator from unintended platform movement.

13 Claims, 11 Drawing Sheets

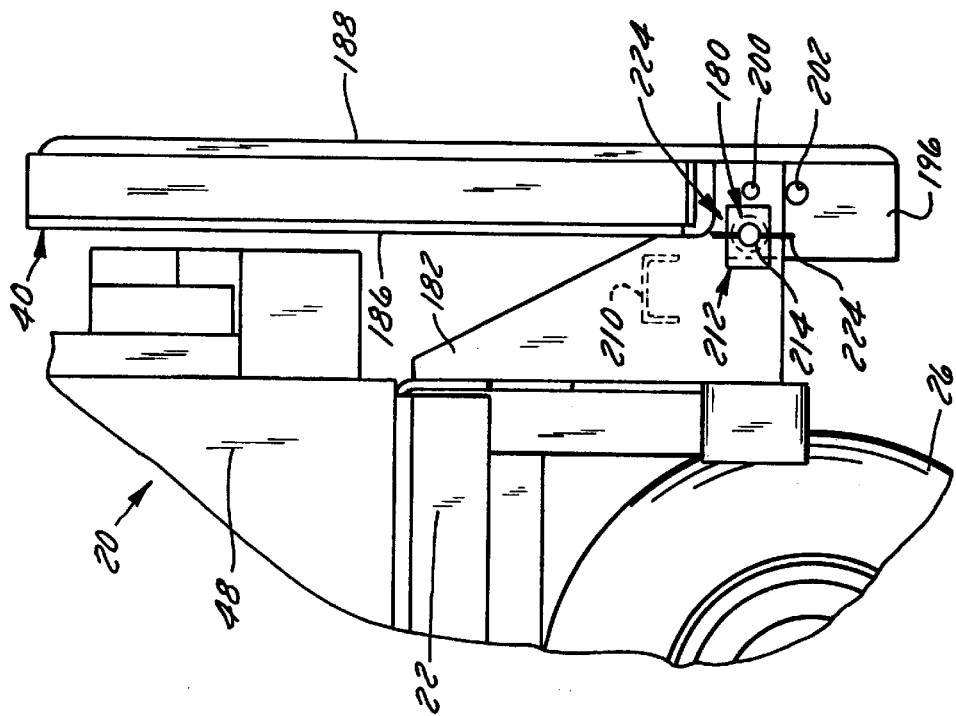
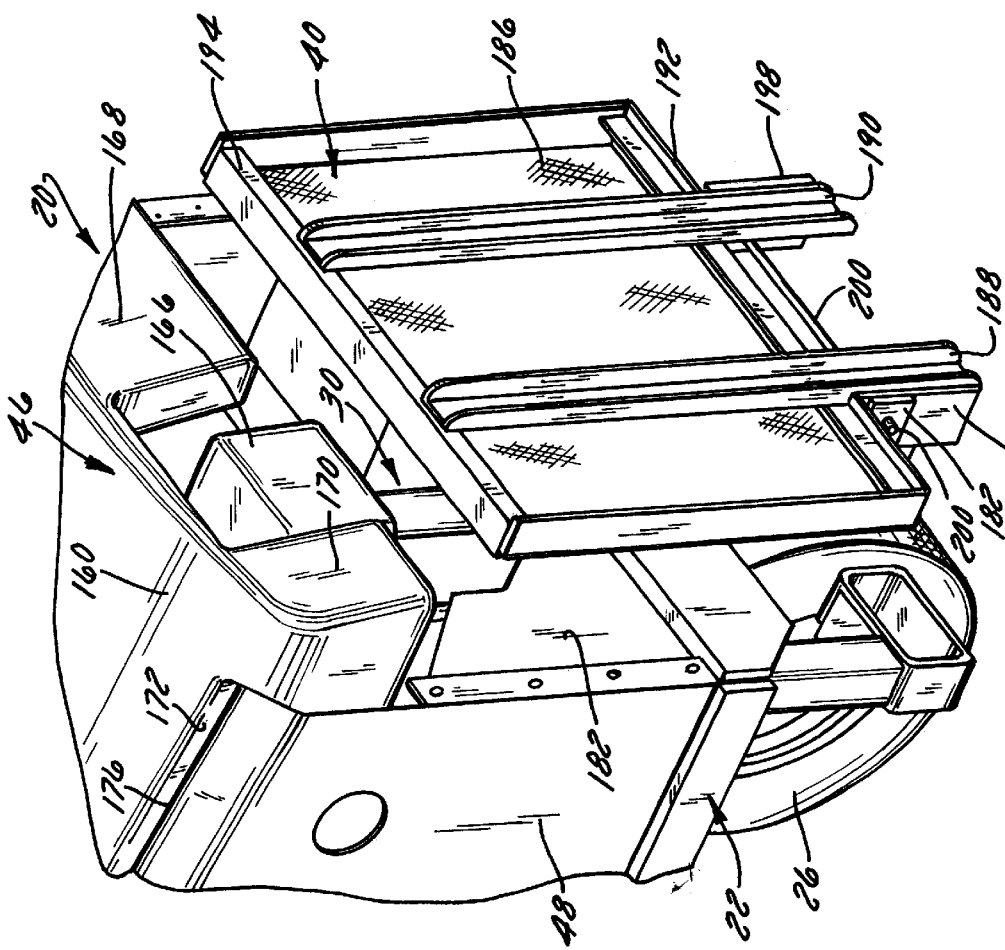

POWER BUGGY

CROSS REFERENCE TO A RELATED APPLICATION

This application is a continuation of U.S. patent application Ser. No. 09/143,753, filed Aug. 31, 1998, now U.S. Pat. No. 6,155,648 and entitled "Power Buggy".

BACKGROUND OF THE INVENTION

1. Field of the Invention

The invention relates to load hauling machines and, more particularly, relates to a "power buggy", i.e., a relatively small, self-propelled load hauling vehicle having a storage bucket and operator's controls. The invention additionally relates to a power buggy designed to maximize operator safety, stability, and comfort.

2. Discussion of the Related Art

Power buggies are well-known light industrial vehicles designed to haul loads of from a few hundred pounds to a few tons. The typical power buggy comprises 1) a chassis supported on the ground via a plurality of wheels, 2) a storage bucket or dumping platform supported on the front end of the chassis and liftable to dump loads, and 3) a power source for propelling the vehicle and for operating, other powered equipment on the vehicle. The typical power buggy is controlled by an operator who is stationed behind the power buggy and who either walks behind the power buggy or stands on an operator's platform mounted on the rear end of the chassis. Controls for the typical power buggy include a steering control mechanism, a speed control mechanism, an engine kill switch or similar controller, and dump controls which raise and lower the bucket. The vehicle is steered by a generally Y-shaped handlebar having a pair of handgrips. Vehicle propulsion is controlled by a squeeze lever mounted adjacent one of the handgrips.

Power buggies of this general type are available from Miller, the Morrison Division of Amida Industries, Inc., the Whiteman Division of Amida Industries, Inc., and Schroeder Industries.

The typical power buggy has several disadvantages impairing operator comfort and even risking operator injury.

For instance, the controls of the typical power buggy are inconveniently located and/or difficult to operate. As an example, the squeeze lever used for speed control operates on generally the same principal as a motorcycle hand brake to the extent that the operator must simultaneously grasp the handgrip and pull a spring-loaded lever towards the handgrip. The vehicle is propelled at a speed proportional to the amount of force applied to the squeeze lever. The squeezing action is somewhat difficult for the operator, and prolonged operation of the squeeze lever can result in operator hand fatigue.

Directional control, i.e., shifting between forward and reverse, is effected by way of a separate shift control lever located remote from the squeeze lever. The operator must release one of the handgrips to shift between forward and reverse with resultant risk of loss of vehicle control. This risk is heightened by the fact that, because speed control and directional control are independent, it is possible for an operator to shift the vehicle while still applying force to the squeeze lever so that the vehicle reverses its direction of travel abruptly, thereby potentially causing the operator to lose his/her balance.

These problems are exacerbated by the fact that other controls are similarly relatively inaccessible and/or hard to operate. For instance, dump controls typically take the form of hand-operated levers which are spaced a substantial distance from the handgrips and which therefore require the release of one of the handgrips for their operation. Some power buggies attempt to alleviate this problem by supplementing the hand levers with redundant foot levers. However, operating the foot levers requires the shifting of the operator's weight to one foot with risk of loss of balance.

All of these factors conspire to render the power buggy relatively difficult to operate with risk of loss of vehicle control and even operator injury. At the very least, the operator risks substantial discomfort in operating the machine.

Many power buggies are powered either directly or indirectly by an internal combustion engine which is located at the rear end of the vehicle in close proximity to the operator. The typical power buggy lacks any effective device for isolating the operator from the engine. Operators of these power buggies therefore experience additional discomfort from the substantial noise, heat, and vibrations from the engine. The fuel tank certainly does nothing to alleviate this problem. In fact, the fuel tank typically comprises a metal tank located in front of the engine and having a relatively low capacity of no more than 1–2 gallons. This relatively small fuel tank must be refilled frequently, which requires on-site storage of fuel with consequent risk of spills.

Some power buggies have an operator's platform which extends rearwardly from the chassis and which permits the operator to stand on the platform and ride on the power buggy while operating it. Some of these platforms are movable from a raised, stowed position in which the platform extends generally vertically to a lowered, operative position in which the platform extends generally horizontally. In addition to reducing the length of the machine for transport, selectively stowing the operator's platform permits the operator to operate the power buggy by walking along behind it rather than riding on the platform. Walk-along operation may be a matter of preference to some operators and is actually quite desirable when the power buggy is being operated on soft ground or under other conditions in which the added weight of the operator could cause the vehicle to leave undesired tracks.

The typical operator's platform is not lockable in either its stowed position or its operative position. It instead relies on gravity to hold it in its operative position and relies on a spring mechanism or an over-center arrangement or the like to hold the platform in its stowed position. This lack of locking capability may risk operator injury under some circumstances. For instance, when the vehicle is traveling up a steep hill with the platform in its stowed position, the force of gravity may overcome the spring arrangement or over-center arrangement and cause the platform to fall backwardly on its own accord and injure the operator's legs. Conversely, if an operator backs into an obstruction while riding on the platform while it is in its operative position, that obstruction may force the platform upwardly and throw the operator from the vehicle or pinch the operator's feet between the platform and the chassis.

The need therefore has arisen to provide a power buggy that can be operated easily, safely, and comfortably while at the same time maximizing vehicle stability.

OBJECTS AND SUMMARY OF THE INVENTION

A first principal object of the invention is to provide a power buggy having a speed/directional control mechanism that permits the operator to control both the speed and direction of vehicle movement without releasing either of the vehicle's handgrips.

Another object of the invention to provide a power buggy that meets the first principal object and that prevents the operator from shifting from one direction of movement to another without reducing vehicle speed.

In accordance with a first aspect of the invention, these objects are achieved by providing a power buggy comprising a plurality of wheels, a movable chassis which is supported on the wheels, a bucket which is supported on the chassis, and a motive power source which is supported on the chassis and which is selectively and alternatively operable to propel the power buggy in a forward direction and in a reverse direction, and an operator's handle. The operator's handle includes a bidirectional twist grip which is designed to be grasped by a hand of an operator and which is operatively coupled to the motive power source such that 1) rotational movement of the twist grip in a first direction from a neutral position causes the motive power source to propel the power buggy in the forward direction and 2) rotational movement of the twist grip in a second direction from the neutral position causes the motive power source to propel the power buggy in the reverse direction.

Preferably, the twist grip is operatively coupled to the motive power source such that power buggy speed increases with increased twist grip rotation in a particular direction through at least most of the range of twist grip movement in that direction.

As a result of this arrangement, vehicle speed and direction are easily controlled by a single device, and these two controls are intertwined such that the vehicle must decelerate at least somewhat gradually before changing directions.

In a preferred embodiment, the twist grip is coupled to the motive power source by a coupling assembly including a cable and converter which converts rotational movement of the twist grip to translational movement of the cable.

A second principal object of the invention is to provide a power buggy having controls arranged to maximize operator safety, stability, and comfort.

In accordance with a second aspect of the invention, this object is achieved by providing a power buggy comprising, a plurality of wheels, a movable chassis which is supported on the wheels, a bucket which is supported on the chassis and which can be raised and lowered to dump loads, and a motive power source which is supported on the chassis and which is selectively and alternatively operable to propel the power buggy in a forward direction and in a reverse direction. The power buggy further comprises an operator's handle that includes first and second grips designed to be grasped by an operator's hands, one of the grips being a twist grip which is operatively coupled to the motive power source such that 1) rotational movement of the twist grip in a first direction from a neutral position causes the motive power source to propel the power buggy in the forward direction and 2) rotational movement of the twist grip in a second direction from the neutral position causes the motive power source to propel the power buggy in the reverse direction. A bucket dump control switch is located at least in the vicinity of one of the grips so as to permit the operator to effect directional control, speed control, and bucket dumping control while holding onto both of the grips.

A third principal object of the invention is to provide a power buggy having an improved fuel tank.

In accordance with still another aspect of the invention, this object is achieved by providing a power buggy comprising a plurality of wheels, a movable chassis which is supported on the wheels, a bucket which is supported on the chassis, an internal combustion engine which is supported on the chassis and which at least indirectly supplies motive power to the wheels, and a fuel tank which stores fuel for the engine. The fuel tank is formed from plastic and at least partially overlies an upper surface of the engine and a rear end of the engine so as to significantly reduce transmission of sounds and vibrations from the engine to an operator located behind the engine.

Preferably, the fuel tank has a storage capacity of at least ten gallons to negate the need for on-site fuel storage and transport.

The fuel tank also preferably has a longitudinal groove formed therein which receives a connector flange of a side shroud of the vehicle. Attachment of the side shroud to the fuel tank in this manner reduces the support framework requirement for the vehicle.

A fourth principal object of the invention is to provide a power buggy having a stowable operator's platform that is lockable in both its stowed position and its operative position so as to maximize operator safety regardless of whether the operator is walking behind the power buggy or riding on the platform.

In accordance with another aspect of the invention, this object is achieved by providing a power buggy comprising a plurality of wheels, a movable chassis which is supported on the wheels, a bucket which is supported on the chassis in the vicinity of a front end of the power buggy manual controls which are located in the vicinity of a rear end of the power buggy, and a stowable operator's platform. The operator's platform is supported on the chassis in the vicinity of the rear end of the power buggy and is movable between 1) a stowed position in which an operator can walk along behind the power buggy while operating the controls and 2) an operative position in which the operator can ride on the operator's platform while operating the controls. The operator's platform is lockable in both the stowed position and the operative position.

Preferably, the stowed position is a raised position in which the operator's platform extends generally vertically and the operative position is a lowered position in which the operator's platform extends generally horizontally. In this case, the operator's platform preferably is mounted on a pivot shaft which extends laterally with respect to the chassis and which rotatably journals the operator's platform to a frame mounted on the chassis. The operator's platform is locked in its raised and lowered positions by a spring-loaded locking pin assembly which is mounted on one of the operator's platform and the frame and at least a portion of which is biased towards holes formed in the other of the operator's platform and the frame.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 16 corresponds to FIG. 13 but illustrates the operator's platform in its stowed or raised position; and FIG. 17 corresponds to FIG. 14 but, like FIG. 16, illustrates the operator's platform in its stowed or raised position.

DETAILED DESCRIPTION OF THE PREFERRED EMBODIMENTS

1. Resume

Figure 1:
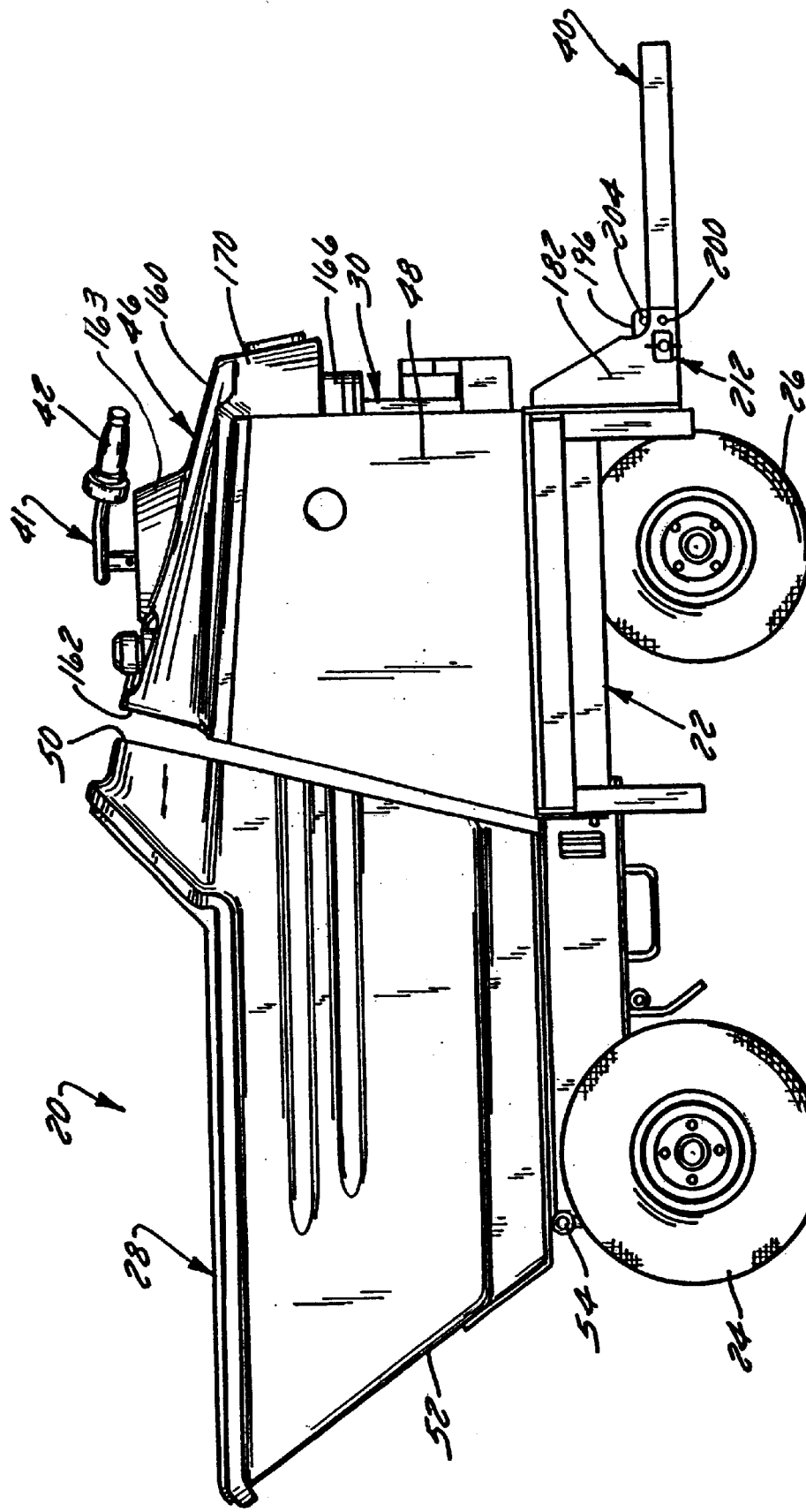
FIG. 1 is a side elevation view of a power buggy constructed in accordance with a preferred embodiment of the invention.

Pursuant to the invention, a power buggy is provided that is safe, stable, easy to control, and comfortable. Frequently-used controls such as dump controls, a speed control, and a directional control, are located at or very near handgrips of the operator's handle so as to permit the operator to control the vehicle without releasing either of the handgrips. For instance, speed and direction are both controlled by a bidirectional twist grip forming one of the handgrips. The twist grip must rotate through a neutral position before changing directional control from forward to reverse so that an operator cannot reverse the vehicle's direction of travel without first rather gradually reducing vehicle speed. Operator comfort is also enhanced by a fuel tank that shields the operator from the engine. The fuel tank also has a large capacity while simultaneously functioning as a support for side shrouds of the vehicle. A stowable operator's platform is lockable in both its stowed and operative positions so as to prevent injury to the operator from unintended platform movement.

2. Power Buggy Overview

Referring initially to FIGS. 1–5, a power buggy 20 is illustrated that is designed to haul loads over relatively short distances at construction sites and the like and to dump those loads at desired locations. The major components of the power buggy 20 include 1) a chassis 22 supported on front and rear wheels 24 and 26, 2) a dumpable article support 28 that is supported on the chassis and that can be selectively raised and lowered to dump loads stored therein, 3) a motive power source 30, 4) operator's controls 32, 34, 36, and 38, and 5) a stowable operator's platform 40.

The chassis 22 may comprise any suitable metal frame supported on wheels or rollers. In the present case, the chassis 22 is supported on front and rear wheels 24 and 26. The front wheels 24 are driven by the motive power source 30. The rear wheels 26 are steered using a handle 41 having a left handgrip 42 and a right handgrip 44. The motive power source and other covered components of the vehicle are bounded from above by a fuel tank 46 (detailed in Section 4. below) and from the sides by side shrouds 48. The side shrouds 48 are attached to the fuel tank 46 at their upper ends as detailed in Section 4. below and are attached to the chassis 22 at their lower ends in a conventional manner. A front shroud (not shown) typically also will be connected at its ends to the side shrouds 48 and at its top to the fuel tank 46.

The dumpable article support 28 may comprise any structure which is capable of supporting articles and of being raised and lowered to selectively dump articles stored therein or thereon. For instance, the article support may comprise a platform. In the illustrated embodiment, the article support comprises a bucket, so the terms "dumpable article support" and "bucket" will be used interchangeably for the sake of convenience. The bucket 28 comprises a plastic storage bucket having a maximum capacity of 2500 pounds. The bucket 28 has a front wall 52 which is relatively low and which is sloped to facilitate dumping. The bucket also has a rear wall 50 which is relatively high so as to enhance load carrying capacity and bucket aesthetics. The front end of the bucket 28 is pivotably mounted on the chassis 22 via a pivot shaft 54. A double acting hydraulic cylinder 56 (FIG. 5) has a cylinder end attached to the chassis 22 and a rod end attached to a bracket 58 mounted on a laterally-central portion of a bottom surface of the bucket 28 in the vicinity of the rear end of the bucket 28. Cylinder extension pivots the bucket 28 about the shaft 54 to dump loads. The motive power source 30 preferably comprises 1) a hydraulic pump 60 (FIGS. 5, 6, and 8) and 2) an internal combustion engine 62 (FIGS. 3, 5, 8, and 9) that is located behind the pump 60 and that supplies power to the pump 60. The engine 62 preferably is a relatively small four-stroke engine of about 10–15 horsepower. The engine 62 also supplies electrical power to the various electronic components of the vehicle 20 by way of an AC charge coil 64 and a DC converter 66, both illustrated in FIG. 5. The AC charge coil 64 and DC converter 66 eliminate the need for a battery, thereby reducing the complexity and weight of the power buggy 20.

Figure 5:
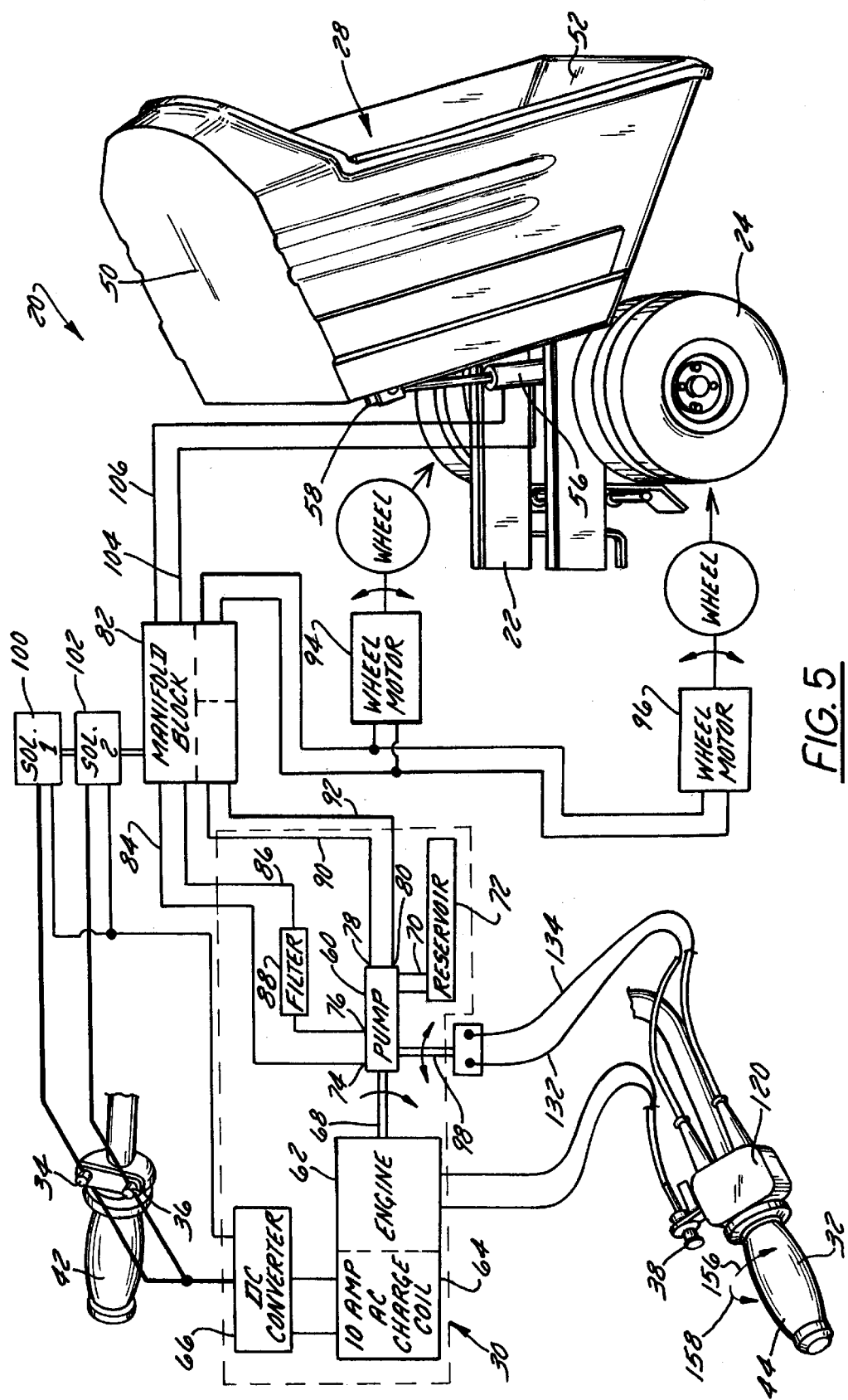
FIG. 5 is a partially schematic, partially perspective view of various controls for the power buggy.

The pump 60 may comprise any pump which can be driven by the engine 62 to supply pressurized hydraulic fluid to other system components. As best seen in FIG. 5, the preferred pump 60 is a hydrostatic pump having 1) an input shaft 68 driven by the engine 62, 2) a fluid inlet 70 connected to a reservoir 72, 3) supply and return ports 74 and 76 in a charge portion of the pump 60, and 4) first and second selectively-pressurized fluid outlet ports 78 and 80 in a hydrostatic portion of the pump 60. The supply port 74 is always pressurized during pump operation and is connected to a valve manifold block 82 (controlled by solenoids 100 and 102 as detailed in Section 3. below) via a supply line 84. The return port 76 is connected to manifold block 82 via a return line 86 having a filter 88 disposed therein. First and second wheel motor supply lines 90 and 92 extend from the outlet ports 78 and 80, through the valve block 82, and to opposite sides of a pair of hydraulic motors 94 and 96, one of which is associated with each front wheel 24. The direction of motor rotation and, accordingly, the direction of front wheel rotation, is controlled by selectively pressurizing only one of the outlet ports 78 and 80. This selection is achieved by operation of a control shaft 98 the operation of which is detailed in Section 3. below.

As discussed briefly above, the operator's controls 32, 34, 36, and 38, fuel tank 46, and operator's platform 40 are all designed to maximize operator comfort and safety and to achieve other benefits. Each of these components will be detailed in turn.

3. Operator's Controls

Referring particularly to FIG. 5, all primary vehicle functions are controlled from locations at or very near the handgrips 42 and 44 so that the operator can operate the vehicle 20 without releasing either handgrip. Specifically, speed and direction are controlled via a bidirectional twist grip 32 forming a gripping surface on one of the handgrips (the right handgrip 44 in the illustrated embodiment). Bucket dumping is controlled by first and second dump control switches 34 and 36 mounted adjacent one of the handgrips (the left handgrip 42 in the illustrated embodiment). Engine shutoff is controlled by a conventional kill switch 38 mounted adjacent one of the handgrips (the right handgrip 44 in the illustrated embodiment). While the kill switch 38 is conventional, the dump control switches 34 and 36 and twist grip 32 are not. These controls will now be described.

Still referring to FIG. 5, fluid flow to the cylinder 56 through the valve block 82 is controlled by first and second solenoids 100 and 102 which, when actuated, control supply and exhaust of hydraulic fluid to the double acting hydraulic cylinder 56 to extend and retract the cylinder 56 in order to raise and lower the bucket 28. Electric power to the solenoids 100 and 102 is controlled by the first and second switches 34 and 36 so that activation of one switch raises the bucket 28, and activation of the other switch lowers the bucket. More specifically, depression of the first switch 34 energizes the first solenoid 100 to pressurize a supply line 104 for the cylinder end of the cylinder 56, thereby extending the cylinder 56 and raising the bucket 28. Depression of the second switch 36 energizes the second solenoid 102 to pressurize a supply line 106 for the rod end of the cylinder 56, thereby retracting the cylinder 56 and lowering the bucket 28.

Still referring to FIG. 5, and as described briefly above, the control shaft 98 for the pump 60 normally assumes a neutral position in which neither of the outlets 78 and 80 is pressurized and in which the wheel motors 94 and 96 are not supplied with pressurized hydraulic fluid. Rotation of the control shaft 98 in one direction causes the pump 60 to supply pressurized fluid to the line 90 to drive the wheels 24 forwardly. Rotation of the control shaft 98 in the opposite direction causes the pump 60 to supply pressurized fluid to the line )92 and drive the wheels 24 in the reverse direction. This operation constitutes a departure from typical hydrostatic-pump-driven power buggies which do not actually change the direction of fluid flow through the pump but which instead use a control valve to selectively pressurize one of the two lines. It also should be noted that vehicle speed is proportional to the magnitude of control shaft rotation from its neutral position so that the operator can easily control the vehicle's speed simply by increasing or decreasing magnitude of control shaft rotation by changing the magnitude of twist grip rotation as detailed below.

Figure 7:
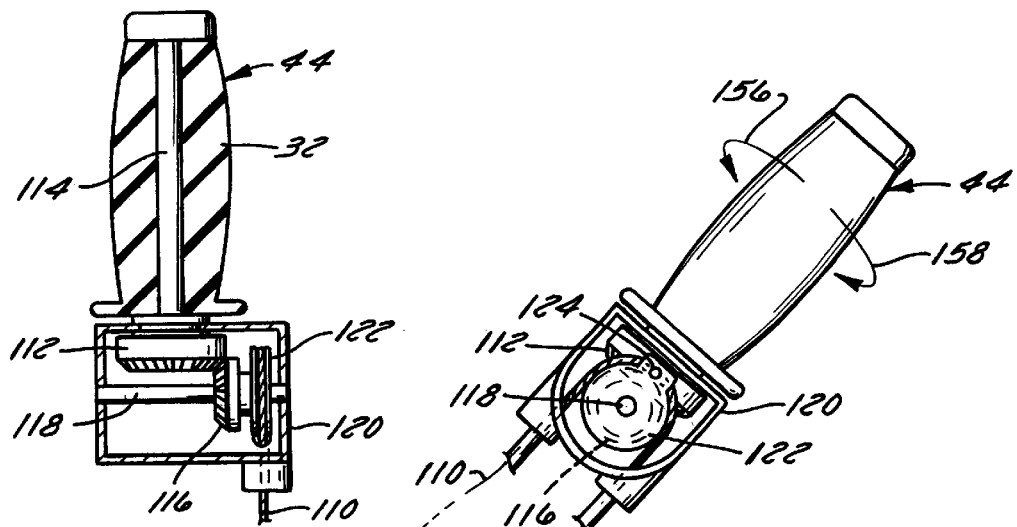
FIG. 7 is a fragmentary end elevation view of the twist grip and an associated converter of the speed/directional control mechanism of FIG. 6.
Figure 6:
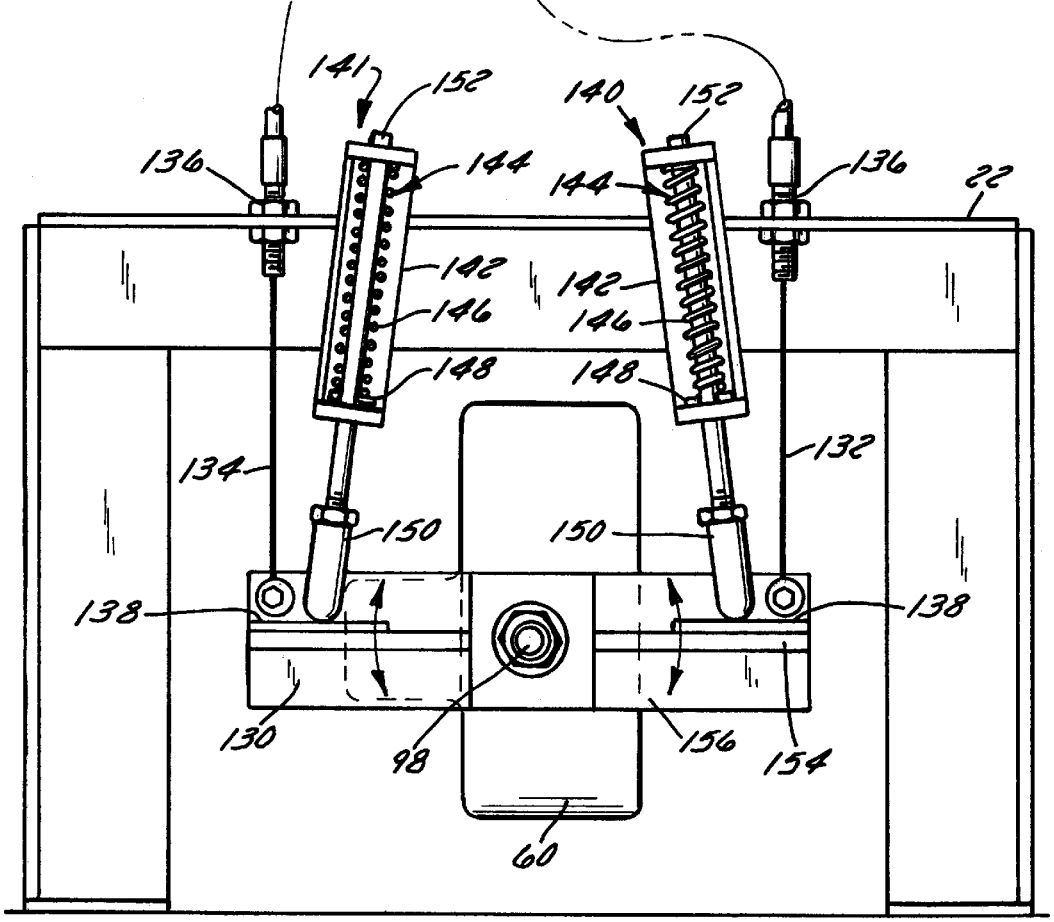
FIG. 6 is a fragmentary elevation view of a speed/directional control mechanism of the power buggy.

The control shaft 98 is operated by a speed/directional control mechanism which normally holds the control shaft 98 in its neutral position and which is selectively operable to rotate the control shaft 98 in either its forward direction or its reverse direction. Referring to FIGS. 6 and 7, this mechanism includes the twist grip 32, a cable 110, a first converter that converts rotational movement of the twist grip 32 to translational movement of the cable 110, and a second converter that converts translational movement of the cable 110 to rotational movement of the control shaft 98.

The first converter includes a drive gear 112, a driven gear 116, and a pulley 122. The drive gear comprises a bevel gear 112 that is mounted on a common support shaft 114 for the twist grip 32 so as to rotate with the twist grip 32. The driven gear 116 meshes with the bevel gear 112 and is mounted on a support shaft 118 journaled in a gear housing 120 encasing both gears 112 and 116. The pulley 122 is formed integrally with the driven gear 116 so as to rotate with the driven gear 116. The cable 110 rides over the pulley 122 and is attached at a generally central portion thereof to a cable ferrule 124 which fits into a slot on the pulley 122. By this arrangement, rotation of the twist grip 32 and consequent pulley rotation drives the cable 110 linearly in the direction of the arrows 126 in FIG. 6.

Still referring to FIG. 6, the second converter includes a swash plate or lever 130 that is coupled to the control shaft 98 and to opposed first and second ends 132 and 134 of the cable 110. The lever 130 also is biased towards a central or neutral position of the control shaft 98 so that motive power is not supplied to the wheels 24 unless the twist grip 32 is rotated. In the illustrated embodiment, a central portion of the lever 130 is attached to the control shaft 98, and the first and second ends 132 and 134 of the cable 110 are attached to opposite ends of the lever 130. More specifically, each end 132 and 134 of the cable 110 passes from the cable ferrule 124, passes through a cable adjuster 136, and is affixed to the respective end portion of the lever 130.

First and second return spring assemblies 140 and 141 bias the lever 130 towards its neutral position. Each return spring assembly 140, 141 extends generally in parallel with an associated cable end 132 or 134 and is located adjacent the associated cable end. Each return spring assembly 140, 141 includes 1) a spring housing 142, 2) a plunger 144 which extends through the spring housing 142, and 3) a helical return spring 146. The return spring 146 surrounds the plunger 144, abuts the support bracket 142 at one end, and abuts a spring seat 148 at its other end so as to bias the plunger 144 towards the lever 130. The effective plunger length and, hence, the biasing force imposed on the lever 130 by the plunger 144 can be adjusted by an adjustment knob 150 that forms a distal end of the plunger 144 and that is threadedly mounted on a rod 152 forming a near end of the plunger 144. A distal end of this adjustment knob 150 abuts a wear pad 138 mounted on a transverse portion 154 of the lever 130 extending perpendicularly to a pump arm portion 156 to which the cable ends 132 and 134 are affixed.

In operation, the return spring assemblies 140 and 141 normally bias the lever 130 and, hence, the control shaft 98 to their neutral positions so that no motive power is transferred to the wheels 24. If the operator wishes to propel the vehicle 20 in the forward direction, he or she simply rotates the twist grip 32 clockwise in the direction of the arrow 156 in FIG. 5 and 6. This twisting movement applies tension to the first end 132 of the cable 110 and pivots the lever 130 and control shaft 98 counterclockwise as seen in FIG. 6. The resultant control shaft rotation causes the pump 60 to deliver pressurized fluid to the line 90, thereby driving the wheels 24 in a forward direction at a speed at least generally proportional to the magnitude of the rotation of the twist grip 32 and, hence, to the magnitude of movement of the lever 130 and the control shaft 98. Upon release of the twist grip 32 by the operator, the lever 130 and the control shaft 98 will return to their neutral positions under the force of the relevant return spring assembly 140 or 141.

It should be apparent from the above that, due to the relationship between the twist grip 32, the control shaft 98, and the wheels 24, the operator cannot reverse the direction of vehicle movement without rather gradually decelerating the vehicle 20. Instead, the operator must first return the twist grip 32 to its neutral position, thereby rather gradually decelerating the vehicle, and then rotate the twist grip 32 in the opposite direction (see arrow 158 in FIGS. 5 and 6) to reverse the direction of vehicle movement. Only then can the operator rotate the twist grip in the direction of arrow 158. This arrangement helps prevent shocks to the vehicle 20 that otherwise could occur if an operator were to shift from one direction of movement to the other at or near full speed.

4. Fuel Tank

The fuel tank 46, best seen in FIGS. 1–4 and 8–12, is unusual in several beneficial respects. First, it is formed from rotationally molded plastic rather than metal. It therefore has good sound and vibration damping characteristics and also can assume a rather convoluted shape. It is also rather large when compared to fuel tanks traditionally used on power buggies—having a capacity of 10–15 gallons as opposed to only 1–2 gallons. It also acts as an attachment surface for the side shrouds 48, thereby negating the need for additional shroud support framework.

Figure 2:
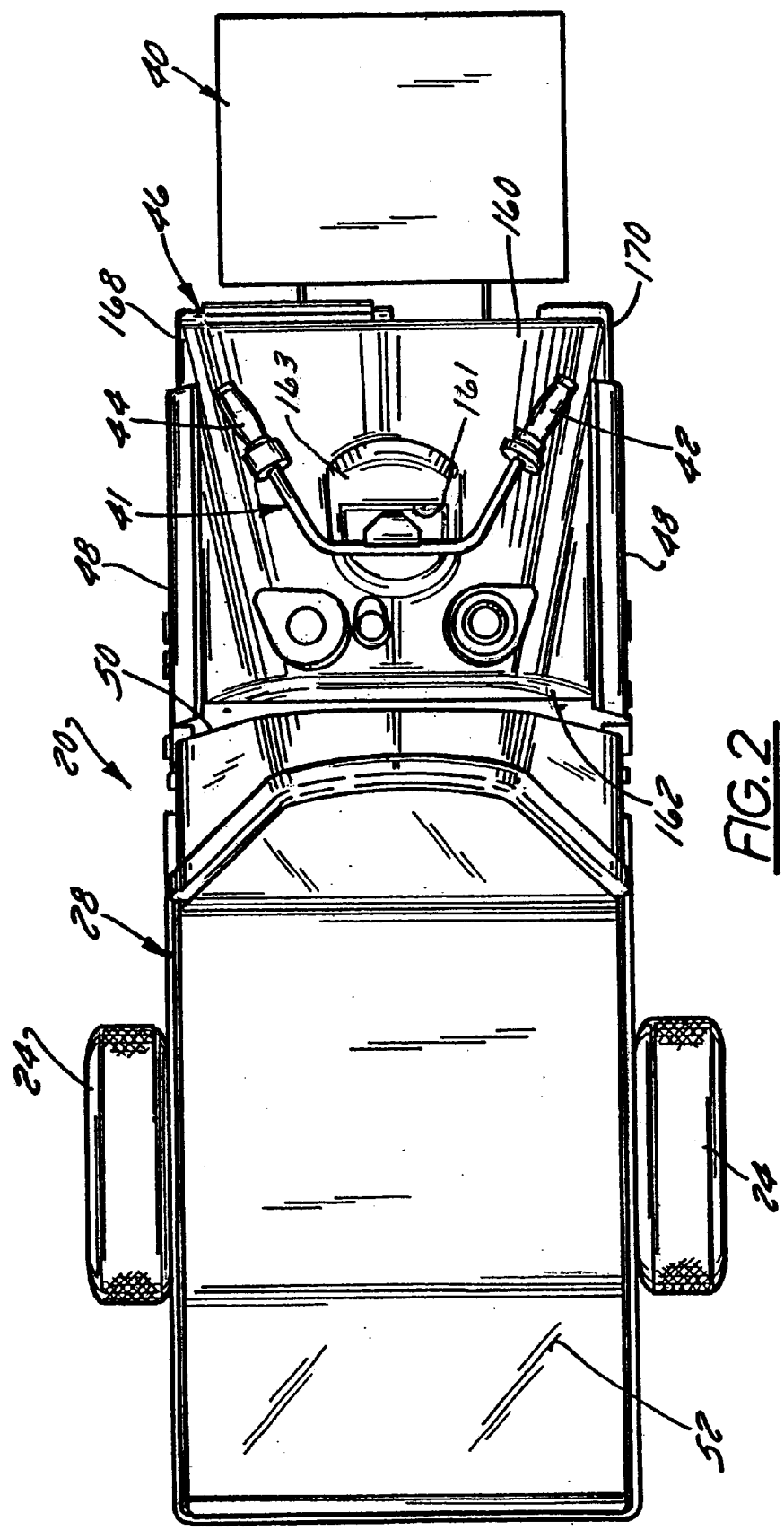
FIG. 2 is a top plan view of the power buggy.
Figure 3:
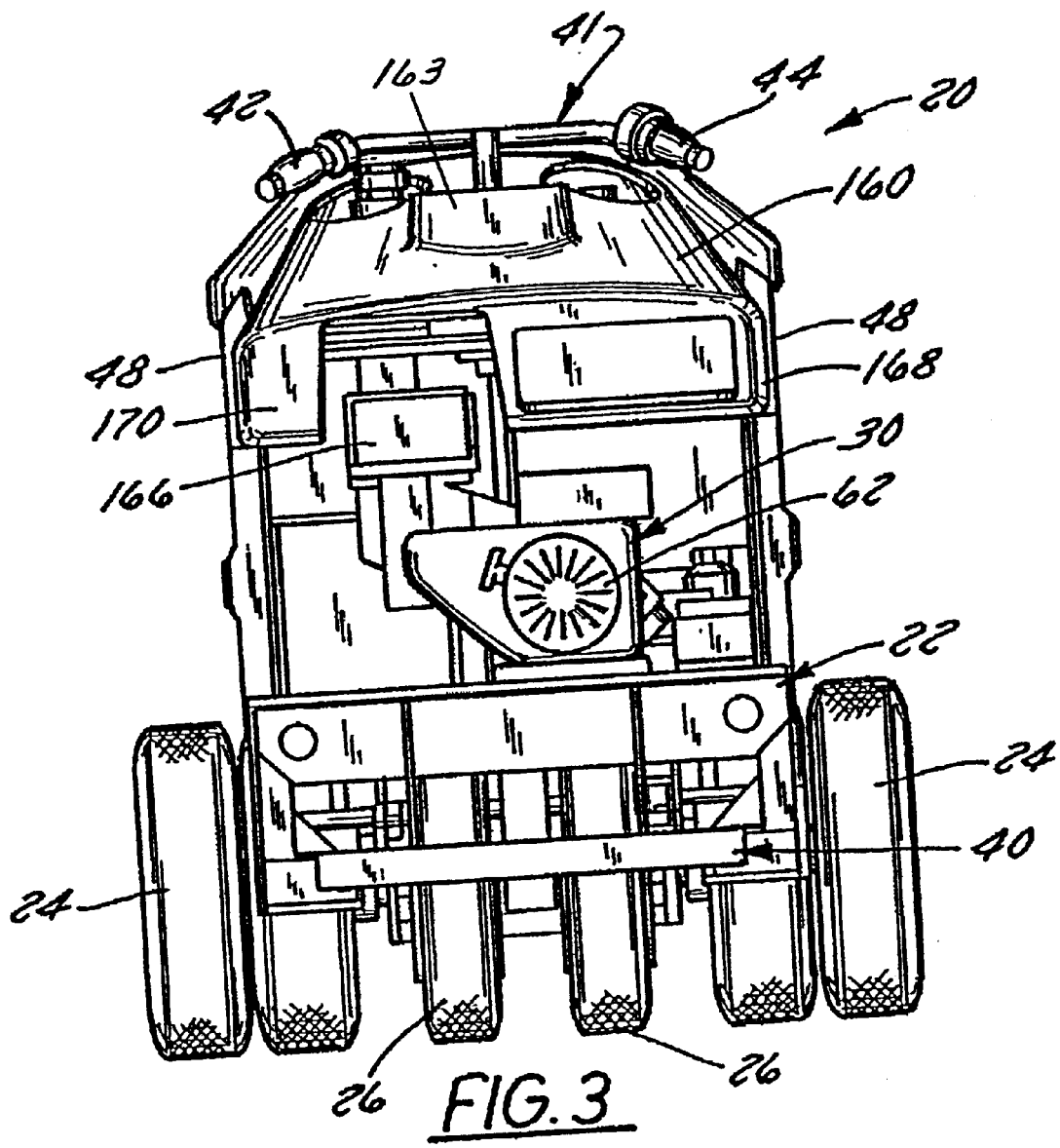
FIG. 3 is a rear elevation view of the power buggy.
Figure 4:
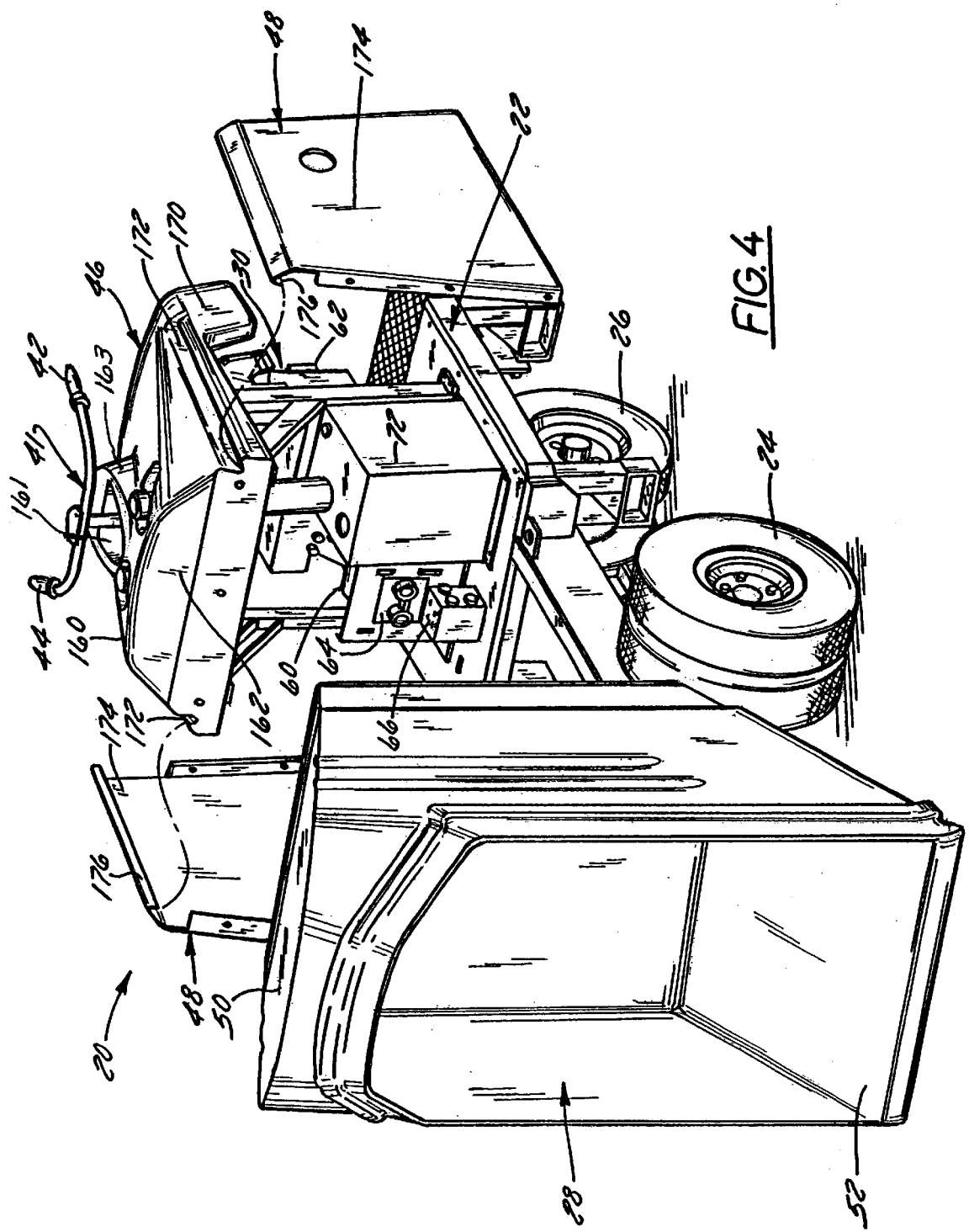
FIG. 4 is a partially exploded perspective view of the power buggy.

An upper surface 160 of the fuel tank 46, best seen in FIGS. 1–4, 8, and 11, is gently curved along its upper surface to enhance its appearance. As best seen in FIGS. 1 and 2, a front end 162 of the fuel tank 46 is sloped upwardly and forwardly so as to be generally parallel with die sloped upper portion of the rear wall 50 of the bucket 28, thereby avoiding interference between the fuel tank 46 and the bucket 28 and enhancing the aesthetic appearance of the power buggy 20. As also clearly illustrated in the drawings, the operator's controls, including at least the steering handle 41, extend upwardly through an opening 161 in the fuel tank 46. The upper end of the opening 161 is surrounded by a collar 163.

Figure 8:
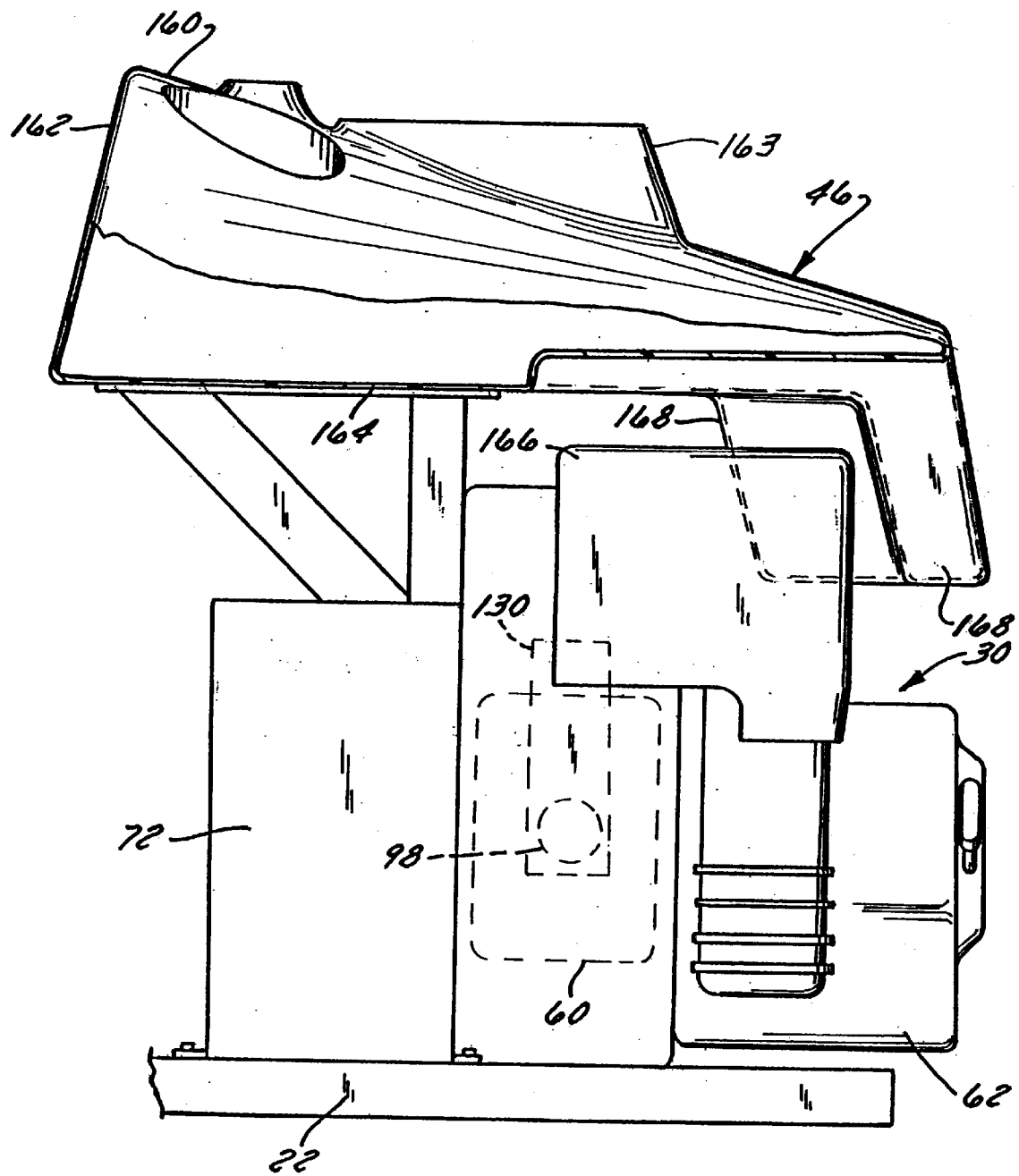
FIG. 8 is a fragmentary side elevation view of a portion of the power buggy including a motive power source and a fuel tank.
Figure 9:
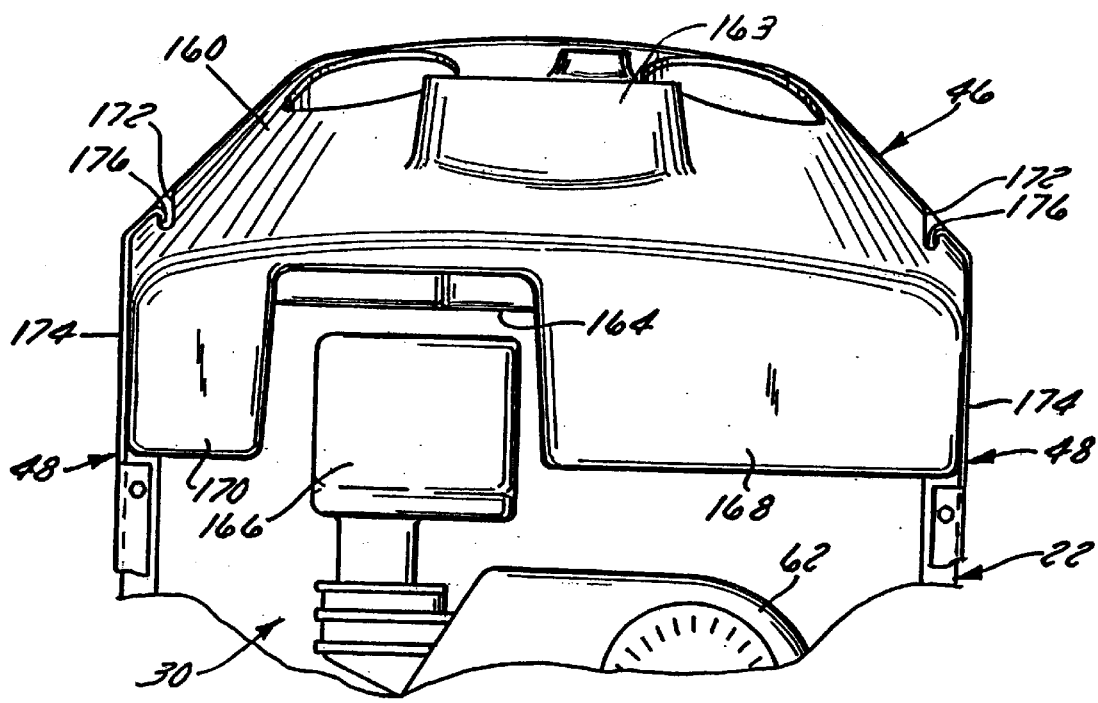
FIG. 9 is a fragmentary rear end view of the assembly of FIG. 8.
Figure 12:
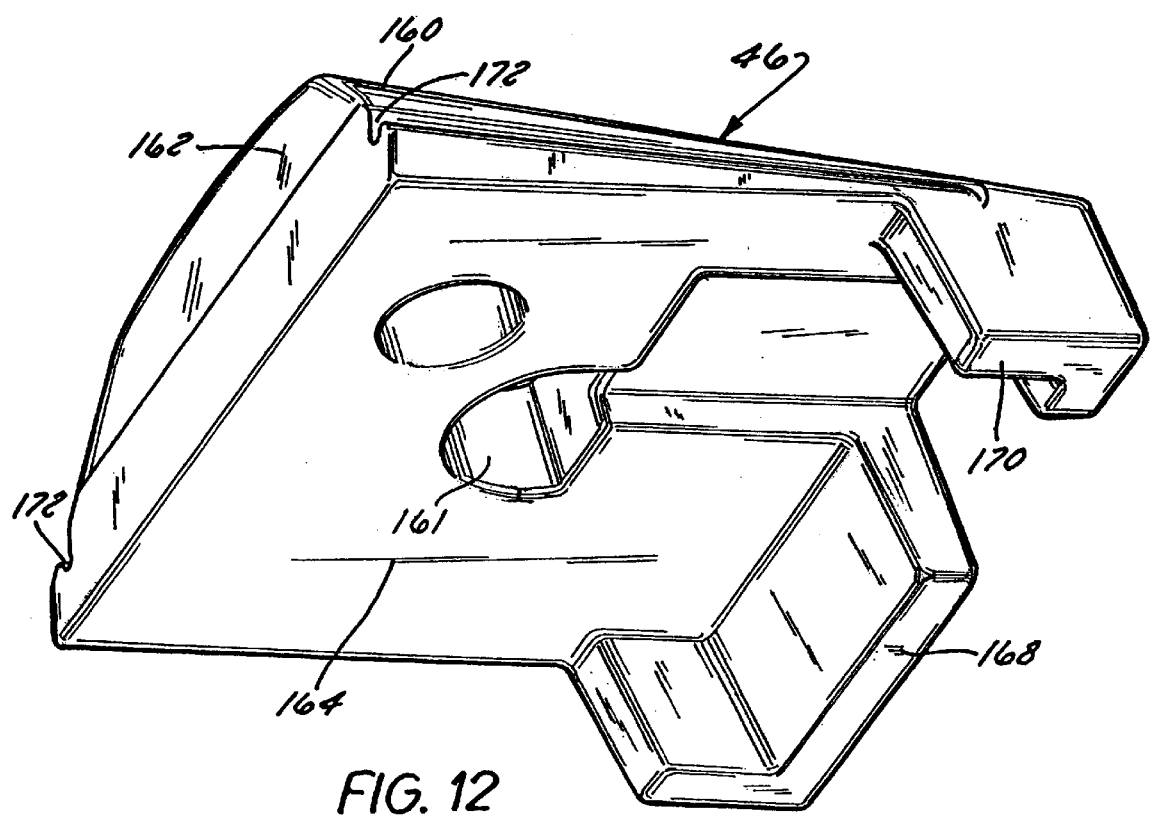
FIG. 12 is a perspective view of the fuel tank, viewed from below.

A bottom surface 164 of the fuel tank 46, best seen in FIGS. 8,9, and 12, is configured so as to overlie the upper surface of the engine 62 and at least some of the rear surface of the engine 62 so as to shield the operator from heat, noise and vibrations from the engine 62. Portions of the bottom surface 164 of the fuel tank 46 are concave so as to nest above adjacent portions of the engine 62 and related components, thereby covering the engine 62. In addition, a pair of L-shaped portions 168,170 of the fuel tank 46 extend downwardly from the bottom surface 164 at a location behind the engine 62 to provide additional fuel storage capacity and to further shield the operator from the engine 62. Lateral segments of portions 168 and 170 are spaced apart at the rear of the tank 46 to accommodate an air filter cowling 166 of the engine 62. Portions 168 and 170 also have longitudinal segments that extend forwardly from the rear of the tank 46 to the shrouds 48 so that much of the rear end of the engine 62 is effectively encased by the fuel tank 46, thereby further isolating the operator from the heat and noise of engine operation.

Figure 10:
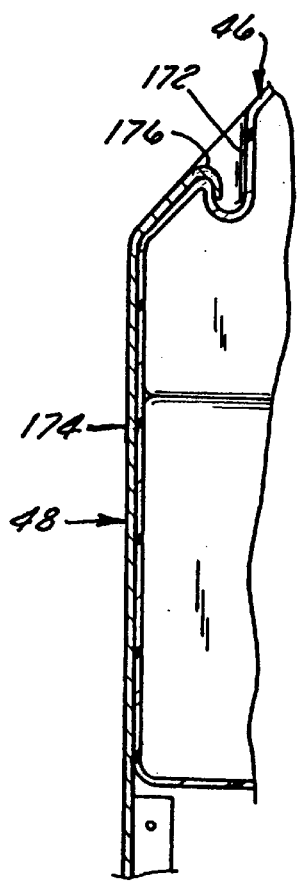
FIG. 10 is an enlarged fragmentary sectional view of the assembly of FIG. 9.
Figure 11:
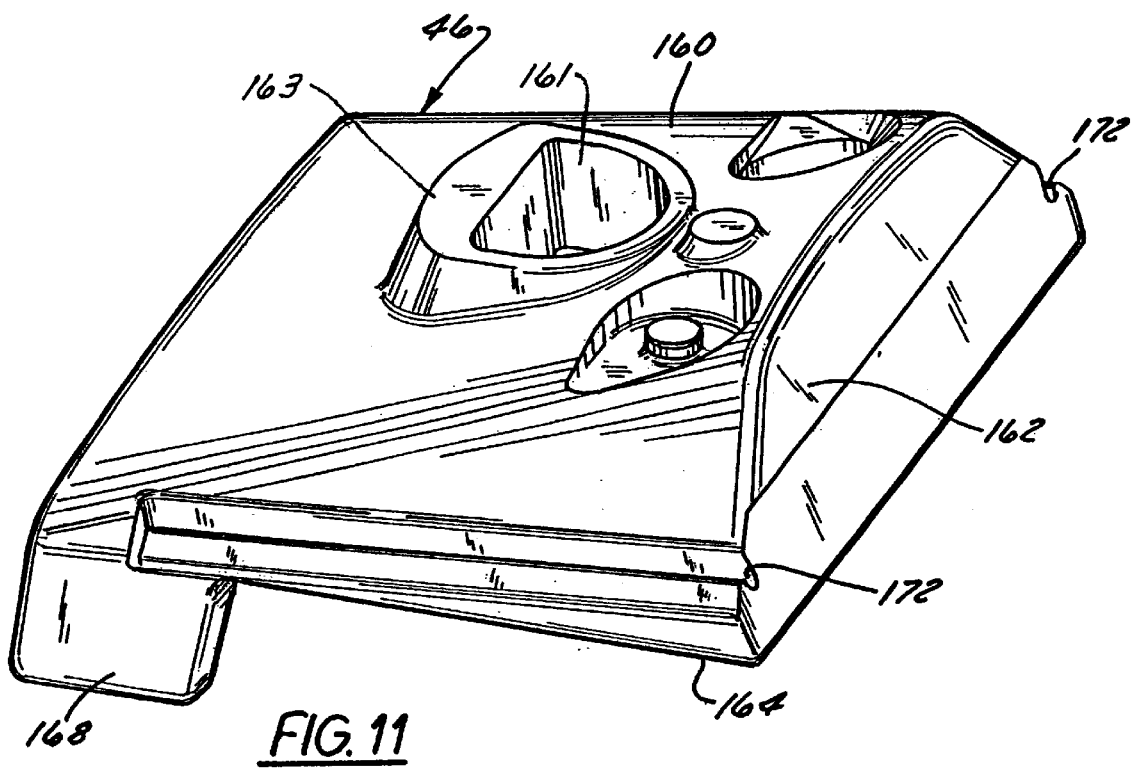
FIG. 11 is a perspective view of the fuel tank, viewed from above.

Referring now to FIGS. 9–11, longitudinally extending, generally upwardly facing grooves 172 are molded into the upper surface 160 of the fuel tank 46 for receiving the side shrouds 48. As best seen in FIG. 10, each side shroud 48 is located closely adjacent the fuel tank 46 and includes 1) a body 174 which extends at least generally vertically along a major portion thereof, and 2) an upper flange 176 which extends generally downwardly from an upper edge of the body 174 and into the associated groove 172 in the fuel tank 46 thereby to secure the shroud 48 to the fuel tank 46. The complementary generally J-shapes of the grooves 172 in the fuel tank 46 and the mating flanges in the shrouds 48 assure a relatively tight connection of the shrouds 48 to the fuel tank 46 and inhibit unintended shroud removal.

5. Operator's Platform

The operator's platform 40 is designed to permit an operator to stand on the platform 40 and to ride on the power buggy 20 while operating the power buggy 20. The operator's platform 40 is also designed to selectively move out of this operative position to a stowed position for transport or for permitting the operator to walk along behind the vehicle 20, if desired. Preferably, the operator's platform 40 is pivotably mounted on the chassis 22 so as to be raised and lowered when moving between its stowed position and its operative position. The preferred operator platform 40 is illustrated in FIGS. 13–17 and can be seen in its lowered or operative position in FIGS. 13–15 and its raised or stowed position in FIGS. 16 and 17. The platform 40 is mounted on the chassis 22 via a support frame and is locked in its stowed and operative positions by a locking pin assembly 180.

Figure 13:
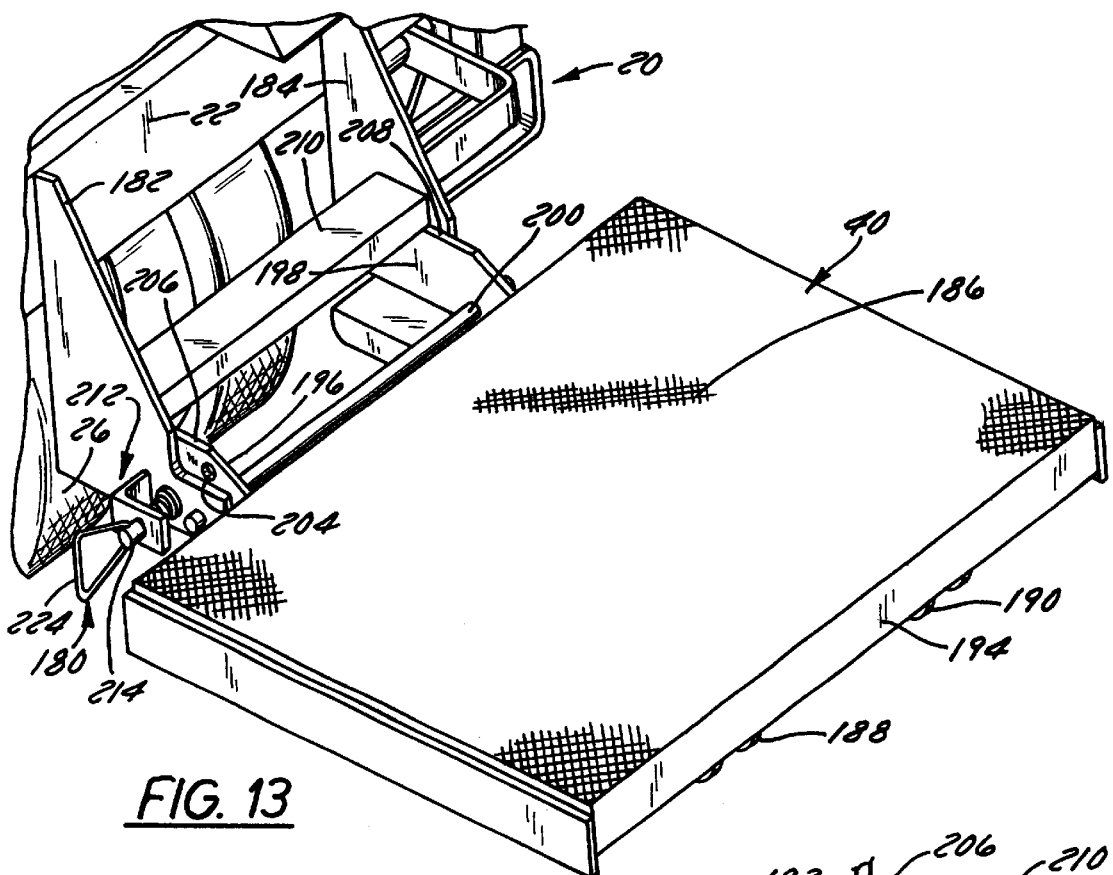
FIG. 13 is a fragmentary perspective view of an assembly on the power buggy including an operator's platform and its associated support structure, showing the operator's platform in its lowered or operative position.
Figure 14:
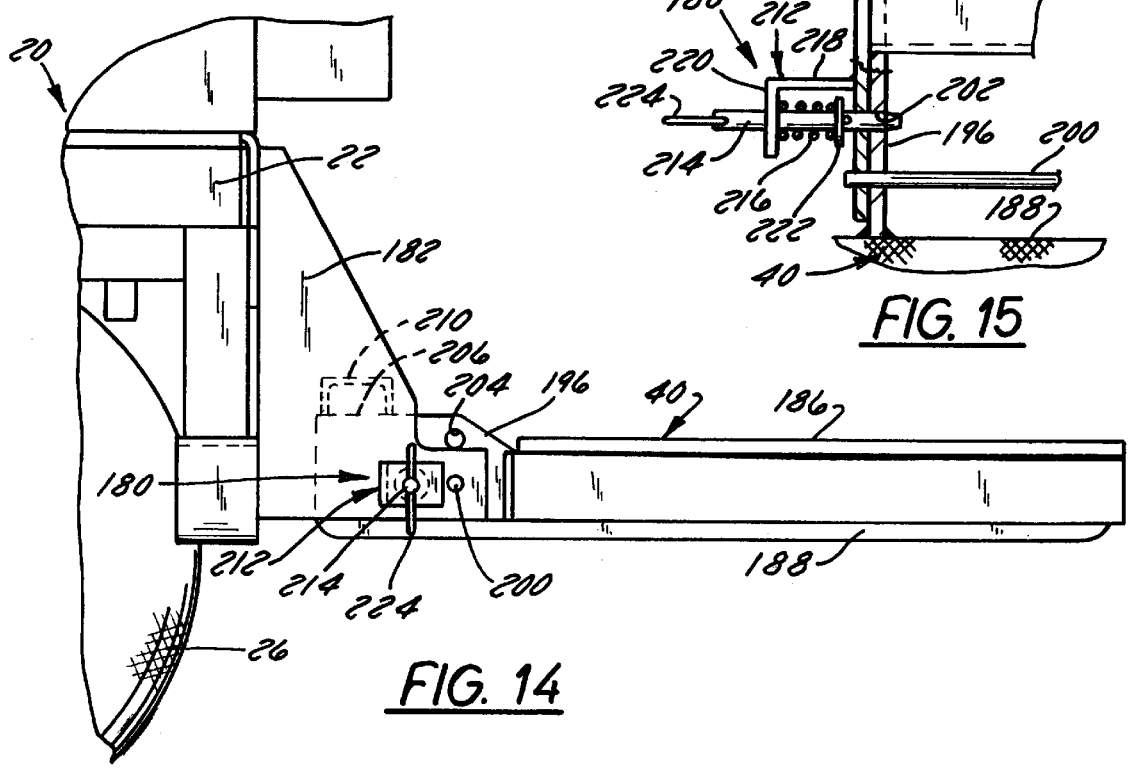
FIG. 14 is a side elevation view of the assembly of FIG. 13.

The support frame includes first and second laterally opposed support braces 182 and 184 which may be mounted on the rear end of the chassis 22 in any conventional manner. Bottom end portions of the braces 182 and 184 extend rearwardly from the chassis 22 sufficiently far to permit unobstructed pivoting of the platform 40 relative to the chassis 22. The platform 40 includes 1) a perforated generally planar support plate 186 and 2) first and second laterally opposed, longitudinally extending support members 188 and 190 on which the support plate 186 is mounted. More specifically, front and rear support bars 192 and 194 extend downwardly from the opposite ends of the support plate 186 and are attached to the support members 188 and 190. Each of the support members 188 and 190 preferably takes the form of an inverted U the center leg of which abuts the front and rear support bars 192 and 194. Mounting brackets 196 and 198 are welded or otherwise affixed to cantilevered ends of the support members 188 and 190 extending beyond the front support bar 192. A pivot shaft 200 extends through the mounting brackets 196 and 198 at a location in front of the support plate 186 and has opposite ends supported on the first and second support braces 182 and 184 of the frame so as to permit pivoting of the support platform 40 relative to the chassis 22. First and second holes 202 and 204 are formed in each of the mounting brackets 196 and 198 for receiving a plunger of the associated locking pin assembly 180 as detailed below. A front end portion of each of the mounting brackets 196 and 198 extends above the associated support member 188, 190 to present a raised surface 206, 208 as best seen in FIGS. 13 and 14. A stop member, taking the form of an inverted U-shaped stop channel 210, extends laterally with respect to the chassis 22 at a location above the pivot shaft 200 and is attached at its opposite ends to the inner surfaces of the support braces 182 and 184. The bottom surface of the stop channel 210 abuts the raised Surfaces 206 and 208 of the mounting brackets 196 and 198 when the operator's platform 40 is in its operative position to prevent pivoting of the platform 40 beyond that position.

Figure 15:
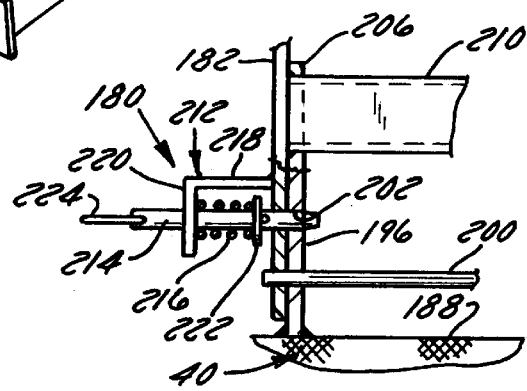
FIG. 15 is a fragmentary plan view of a portion of the assembly of FIGS. 13 and 14, illustrating locking of the operator's platform to its associated support structure.

The locking pin assembly 180, best seen in FIG. 15 includes a plunger guide 212, a plunger 214, and a spring 216. The plunger guide includes an L-shaped member having 1) a lateral leg 218 affixed to the outer surface of the support brace 182 and 2) a longitudinal leg 220 extending rearwardly from the lateral leg 218. The plunger 214 extends through a hole in the longitudinal leg 220 of the plunger guide 212, through a mating hole in the support brace 182, and towards the mounting bracket 196 for the operator's platform 40. The spring 216 surrounds the plunger 214 and rests on the plunger guide 212 at its outer end and on a plunger-mounted spring seat 222 at its inner end so as to bias the plunger 214 towards the mounting bracket 196. The first and second holes 202 and 204 in the mounting bracket 196 are spaced such that the plunger 214 is aligned with the first hole 202 when the platform 40 is in its operative position and with the second hole 204 when the platform 40 is in its stowed position.

In operation, the operator will typically stand on the operator's platform 40 while operating the power buggy 20, with the operator's platform 40 being locked in the operative position of FIGS. 13–15 by extension of the plunger 214 into the first hole 202 in the mounting bracket 196. This locking action prevents the operator's platform 40 from pivoting upwardly should the power buggy 20 back into an obstruction such as a curb or a hillside. Contact between the raised surfaces 206 and 208 of the mounting brackets 196 and 198 and the bottom surface of the stop channel 210 helps assure stability by distributing the operator's weight between the pivot shaft 200 and the stop channel 210.

Should the operator wish to stow the platform 40 either to prepare the power buggy 20 for transport or to permit the operator to walk along behind the power buggy 20 during operation, he or she simply retracts the plunger 214 by grasping a ring 224 on the end of the plunger 214 and pulling the plunger 214 out of the first hole 202 against the force of the return spring 216. The operator then pivots the platform 40 to its raised position of FIGS. 16 and 17 and releases the ring 224 so that the plunger 214 is driven into the second hole 204 by the return spring 216, thereby locking the platform 40 in its raised position.

Many changes and modifications could be made to the invention without departing from the spirit thereof. The scope of some of those changes is discussed above. The scope of other changes will become apparent from the appended claims.

We claim:

1. A power buggy comprising:
   (A) a plurality of wheels;
   (B) a movable chassis which is supported on said wheels and which has front and rear end portions;
   (C) a dumpable article support which is supported on said front end portion of said chassis;
   (D) an internal combustion engine which is supported on said rear end portion of said chassis and which at least indirectly supplies motive power to said wheels;
   (E) a fuel tank which stores fuel for said engine, said fuel tank being formed from plastic and at least partially overlying an tipper surface of said engine; and
   (F) operator's controls which extend upwardly through said fuel tank and which are accessible by an operator stationed behind said power buggy.

2. The power buggy as recited in claim 1, wherein said chassis includes a frame, and further comprising a side shroud having a lower end portion connected to said frame and an upper end portion connected to said fuel tank.

3. The power buggy as recited in claim 2, wherein said shroud has an at least generally vertical body and a flange which forms said upper end portion of said shroud, which extends inwardly from an upper end portion of said body, and which is secured to said fuel tank.

4. The power buggy as defined in claim 1, wherein said fuel tank is sufficiently long and wide to completely overlie an upper surface of said internal combustion engine.

5. A power buggy comprising:
   (A) a plurality of wheels;
   (B) a movable chassis which is supported oil said wheels and which has front and rear end portions;
   (C) a dumpable article support which is supported on said front end portion of said chassis;
   (D) an internal combustion engine which is supported on said rear end portion of said chassis and which at least indirectly supplies motive power to said wheels;
   (E) a fuel tank which stores fuel for said engine, said fuel tank being formed from plastic and at least partially overlying an upper surface of said engine; and
   (F) operator's controls which extend upwardly through said fuel tank and which are accessible by an operator stationed behind said power buggy, wherein said chassis includes a frame, and further comprising a side shroud having a lower end portion connected to said frame and an upper end portion connected to said fuel tank, wherein said shroud has an at least generally vertical body and a flange which forms said upper said portion of said shroud, which extends inwardly from an upper end portion of said body, and which is secured to said fuel tank wherein said fuel tank has a longitudinally extending lateral edge portion which is of reduced thickness when compared to a laterally central portion thereof, and wherein said flange of said shroud is connected to said edge portion of said fuel tank.

6. The power buggy as defined in claim 5, wherein a longitudinally-extending groove is formed in an upper surface of said edge portion of said fuel tank, and wherein said flange of said shroud has a hook portion which extends into said groove in said fuel tank to secure said shroud to said fuel tank.

7. A power buggy comprising:
   (A) a plurality of wheels;
   (B) a movable chassis which is supported on said wheels and which has front and rear end portions;
   (C) a dumpable article support which is supported on said front end portion of said chassis;
   (D) an internal combustion engine which is supported on said rear end portion of said chassis and which at least indirectly supplies motive power to said wheels;
   (E) a fuel tank which stores fuel for said engine, said fuel tank being formed from plastic and at least partially overlying an upper surface of said engine; and
   (F) a handle which extends upwardly through an opening in said fuel tank and which is accessible by an operator stationed behind said power buggy to steer said power buggy.

8. A power buggy comprising:
   (A) a plurality of wheels;
   (B) a movable chassis which is supported on said wheels and which has front and rear end portions;
   (C) a dumpable article support which is supported on said front end portion of said chassis;
   (D) an internal combustion engine which is supported on said rear end portion of said chassis and which at least indirectly supplies motive power to said wheels;

(E) a fuel tank which stores fuel for said engine, said fuel tank being formed from plastic and disposed above said engine, said fuel tank including a top wall, a pair of side panels extending downwardly from opposite sides of said top wall, and a bottom wall extending between said side panels; and (F) operator's controls which extend upwardly through apertures in said top and bottom walls in said fuel tank and which are accessible by an operator stationed behind said power buggy.

9. A power buggy comprising:

(A) a plurality of wheels;

(B) a movable chassis which is supported on said wheels and which has front and rear end portions;

(C) a dumpable article support which is supported on said front end portion of said chassis;

(D) an internal combustion engine which is supported on said rear end portion of said chassis and which at least indirectly supplies mode of power to the wheels;

(E) an enclosure which is disposed on said chassis and which generally encloses at least part of said engine, said enclosure including 1) a top surface formed from a hollow plastic fuel tank disposed above said engine, and 2) a pair of side shrouds which extend downwardly from said top surface on opposite sides of said engine and which are attached to opposite sides of said fuel tank; and (F) an operator's steering handle which extends upwardly through an opening in said fuel tank and which is accessible by an operator stationed behind said power buggy.

10. The power buggy of claim 9, further comprising a collar which is formed on a top surface of said fuel tank and which surrounds said opening.

11. The power buggy of claim 9, wherein said side shrouds are releasably attached to said fuel tank.

12. The power buggy of claim 11, wherein said side shrouds are formed of metal.

13. The power buggy of claim 11, wherein each of said side shrouds has an at least generally vertical body and a flange which extends inwardly from an upper end portion of said body and which is secured to said fuel tank.

* * * * *

UNITED STATES PATENT AND TRADEMARK OFFICE
CERTIFICATE OF CORRECTION

PATENT NO. : 6,322,151 B1
DATED : November 27, 2001
INVENTOR(S) : Gregory S. Dombek et al.

Page 1 of 1

It is certified that error appears in the above-identified patent and that said Letters Patent is hereby corrected as shown below:

<u>Column 9,</u>
Line 38, change "die" to -- the --;

<u>Column 11,</u>
Line 58, change "tipper" to -- upper --; and

<u>Column 12,</u>
Line 27, change the second occurrence of "said" to -- end --.

Signed and Sealed this

Second Day of April, 2002

*Attest:*

*Attesting Officer*

JAMES E. ROGAN
*Director of the United States Patent and Trademark Office*